(No Model.)

E. G. PASSMORE.
BEARING FOR SHAFTS OF LAWN MOWERS.

No. 518,468. Patented Apr. 17, 1894.

Witnesses
Hamilton D. Turner
William A. Barr

Inventor
Everett G. Passmore
by his attorneys
Howson & Howson

UNITED STATES PATENT OFFICE.

EVERETT G. PASSMORE, OF HAVERFORD, PENNSYLVANIA.

BEARING FOR SHAFTS OF LAWN-MOWERS.

SPECIFICATION forming part of Letters Patent No. 518,468, dated April 17, 1894.

Application filed June 12, 1893. Serial No. 477,351. (No model.)

*To all whom it may concern:*

Be it known that I, EVERETT G. PASSMORE, a citizen of the United States, and a resident of Haverford, Montgomery county, Pennsylvania, have invented certain Improvements in Bearings for the Shafts of Lawn-Mowers and other Machinery, of which the following is a specification.

The object of my invention is to so construct a lawn mower as to provide a rigid resistance to movement of the cutter shaft due to the thrust of the driving gears upon the same, and also to provide a rigid bearing for determining the position of the cutter shaft in respect to the fixed cutting blade of the machine, while at the same time any wear of the cutter shaft or its bearing is automatically compensated for and a snug bearing for the shaft is at all times insured without any tendency of the shaft to bind, provision being also afforded for any adjustment of the shaft in respect to the fixed blade, or cutter which may be desired.

Figure 3:
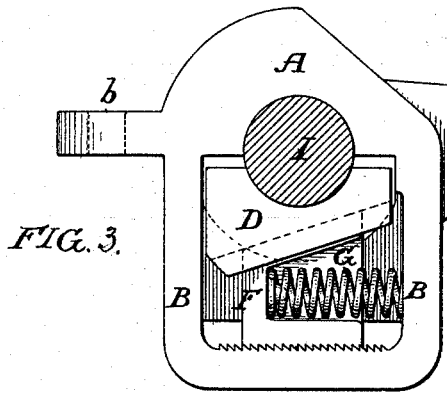
Figure 4:
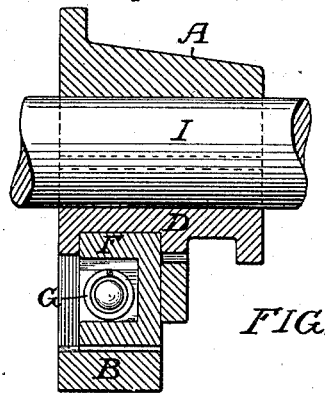
Figure 1:
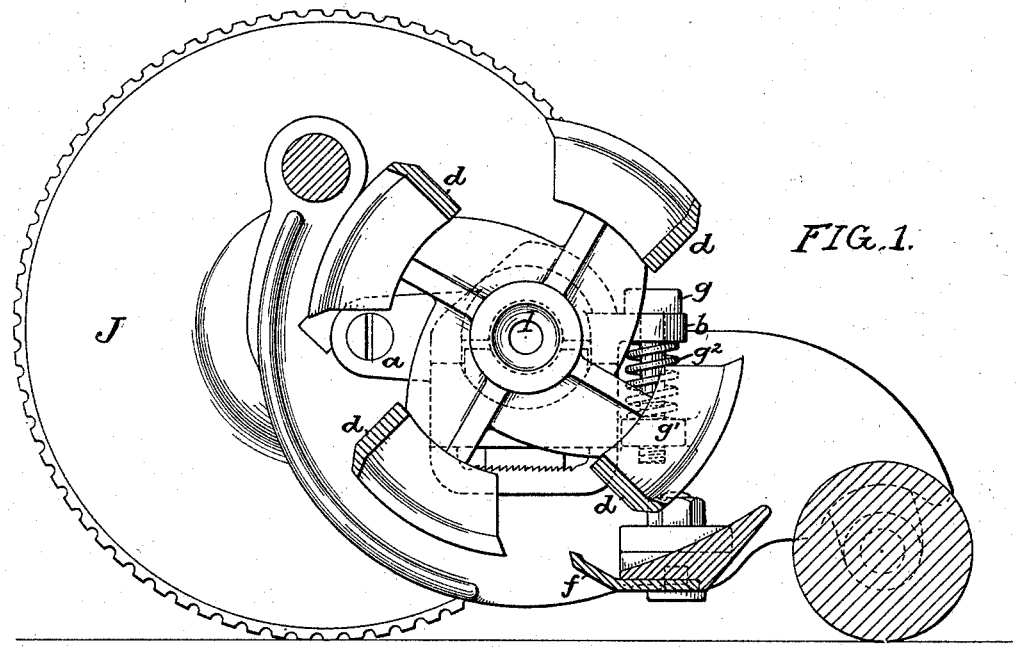
Figure 2:
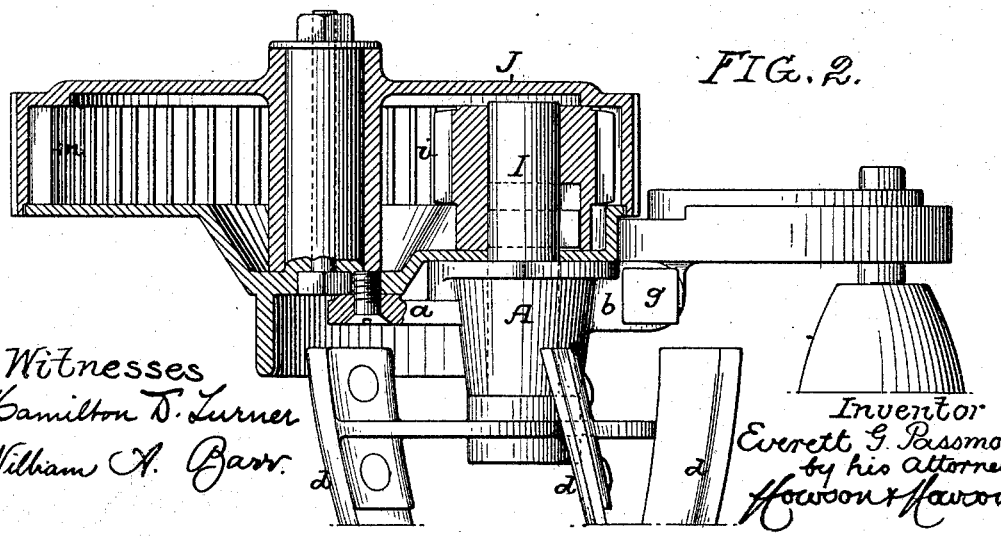

In the accompanying drawings: Figure 1, is a view partly in longitudinal section, and partly in elevation of sufficient of a lawn mower to illustrate my present invention. Fig. 2, is a sectional plan view of the same, partly in elevation. Fig. 3, is an enlarged side view of one of the bearings for the cutter shaft; and Fig. 4, is a transverse section of said bearing.

In Figs. 1 and 2 I represents the shaft of the rotating cutter which has blades $d$ acting in conjunction with the fixed blade or cutter $f$ which is suitably mounted upon the frame of the machine. The shaft I is adapted to bearings in the hanger A which constitutes the upper or fixed half of the bearing, and has a depending yoke B, said hanger having at one side an arm $a$ whereby it is hung to the frame of the machine, and at the other side a projecting perforated lug $b$ for the reception of an adjusting screw $g$ which passes through said perforated lug $b$ of the hanger and is adapted to a threaded opening in a lug $g'$ on the fixed frame of the machine so that the hanger can be depressed to such an extent as to insure proper action of the cutting knives $d$ and $f$, a spring $g^2$ interposed between the lugs $b$ and $g'$ serving to provide the proper support for the lug $b$ of the hanger and maintain the same constantly in contact with the head of the adjusting screw $g$.

The end of the shaft I projects beyond the hanger A and beyond the side frame of the machine, as shown in Fig. 2, and this projecting end of the shaft carries a pinion $i$ which is clutched to the shaft by any of the usual forms of ratchet and pawl connection and is engaged by the internal gear $m$ formed upon the supporting traction wheel J of the machine. The point of engagement of the gear $m$ and pinion $i$ is on the rising side of the wheel, hence the gear not only tends to rotate the pinion, but also has a lifting influence upon the shaft I, which influence, however, is counteracted by the fact that the upper portion of the bearing for said shaft is rigid and is rigidly confined to the frame of the machine by the bolt $g$ hence any rising of the cutter shaft I such as might otherwise be caused by the thrust of the drive gears and such as would permit undue separation of the cutting blades $d$ and $f$ is effectually prevented, the rigid upper portion of the bearing constituting the means which determines the permissible extent of operation of said cutting blades. The necessary adjustment of the shaft I being thus permitted by means of a rigid bearing, it becomes necessary to compensate for wear of the shaft or bearings, and this I accomplish by the use of a lower movable block D embracing the lower portion of the shaft I and resting upon a hollow wedge F, the upper portion of which is fitted to a groove or recess in the under side of said block D, the lower portion of the wedge resting upon the bottom of the yoke B and being ribbed or corrugated so as to engage with a correspondingly ribbed or corrugated surface on the bottom bar of the yoke in order to prevent any retracting of the wedge block such as would permit undue loosening of the lower half of the bearing. A spring G is contained within the opening or recess in the wedge block and bears against one of the sides of the yoke B so as to tend to move said wedge block forward and constantly support the lower half of the bearing in close contact with the shaft, thereby providing a snug bearing for the latter, and automatically compensating for wear of the same or of either of the two parts of the bearing. As soon as there is any looseness of fit the wedge F will be projected by the spring G so as to cause the teeth at the bottom of the wedge to rise slightly upon the teeth at the bottom of the yoke, and when this occurs, the wedge will always be free to move back again to the extent of said rise when downward pressure is exerted upon the bearing block D to an extent sufficient to overcome the pressure of the spring G, hence the binding or jamming of the shaft in its bearings will be prevented in case said shaft is not perfectly true.

Having thus described my invention, I claim and desire to secure by Letters Patent—

1. The within described bearing for the rotary knife shaft of a lawn mower, said bearing consisting of a portion normally fixed and having a seat for one side of the shaft, a movable block bearing upon the other side of the shaft, a wedge acting upon said block and having teeth engaging with a correspondingly toothed bearing for preventing undue retraction of the wedge, and a spring acting upon said wedge to move the same forward, substantially as specified.

2. The combination of the fixed and rotary knives of a lawn mower, the rotary knife shaft, means for rotating the same, a normally fixed bearing for said shaft, a movable block bearing upon the shaft, a wedge interposed between said movable block, and a support upon the normally fixed portion of the bearing, both wedge and support being provided with teeth for preventing undue retraction of the wedge, and a spring acting upon said wedge to move the same forward, substantially as specified.

In testimony whereof I have signed my name to this specification in the presence of two subscribing witnesses.

EVERETT G. PASSMORE.

Witnesses:
FRANK E. BECHTOLD,
JOSEPH H. KLEIN.